US012567652B2

(12) United States Patent
Suyama

(10) Patent No.: US 12,567,652 B2
(45) Date of Patent: Mar. 3, 2026

(54) ZINC SECONDARY BATTERY

(71) Applicant: TOYOTA JIDOSHA KABUSHIKI KAISHA, Toyota (JP)

(72) Inventor: Hiroshi Suyama, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 492 days.

(21) Appl. No.: 18/186,241

(22) Filed: Mar. 20, 2023

(65) Prior Publication Data

US 2023/0378608 A1      Nov. 23, 2023

(30) Foreign Application Priority Data

May 19, 2022    (JP) ................................. 2022-082325

(51) Int. Cl.
H01M 50/451          (2021.01)
H01M 10/26           (2006.01)
              (Continued)

(52) U.S. Cl.
CPC ......... H01M 50/451 (2021.01); H01M 10/26 (2013.01); H01M 50/417 (2021.01); H01M 50/434 (2021.01); H01M 50/457 (2021.01)

(58) Field of Classification Search
CPC ............. H01M 50/451; H01M 50/417; H01M 50/457; H01M 50/434; H01M 10/26
              (Continued)

(56) References Cited

U.S. PATENT DOCUMENTS

| 4,225,657 A | 9/1980 | Klein et al. |
| 2017/0062785 A1* | 3/2017 | Shi ........................ B32B 27/308 |

(Continued)

FOREIGN PATENT DOCUMENTS

| JP | S5498941 A | 8/1979 |
| JP | 2003-022792 A | 1/2003 |

(Continued)

OTHER PUBLICATIONS

Satoshi Ogawa, et al., "The Development of the Organic/Inorganic Composite Separator for Use in Secondary Zinc Batteries", Electrochemistry, 2022, 90(1), 017001, The Electrochemical Society of Japan (Sep. 29, 2021).

(Continued)

*Primary Examiner* — James M Erwin
(74) *Attorney, Agent, or Firm* — Dickinson Wright, PLLC

(57) ABSTRACT

The present disclosure provides a zinc secondary battery with an improved cycle characteristic. The zinc secondary battery of the disclosure has a positive electrode layer, a covering film-attached porous film layer and a negative electrode layer in that order, with an electrolyte solution impregnating the positive electrode layer, the covering film-attached porous film layer and the negative electrode layer, wherein the covering film-attached porous film layer has a porous film layer and a porous covering film formed on the porous film layer, the covering film-attached porous film layer is directly adjacent to the negative electrode layer, and the porous covering film comprises at least one compound selected from the group consisting of $Mg(OH)_2$, $Mg_2P_2O_7$, $MgTiO_3$, $MgCO_3$, $Ca(OH)_2$, $CaSO_4$, $Ca_2P_2O_7$, $SrTiO_3$, $SrF_2$, $TiO_2$, $SnO_2$, $Zr(OH)_4$ and $ZrO_2$.

5 Claims, 6 Drawing Sheets

(51) Int. Cl.
    *H01M 50/417*      (2021.01)
    *H01M 50/434*      (2021.01)
    *H01M 50/457*      (2021.01)
(58) Field of Classification Search
    USPC ......................................................... 429/207
    See application file for complete search history.

(56) References Cited

U.S. PATENT DOCUMENTS

| | | | |
|---|---|---|---|
| 2017/0346063 A1 | 11/2017 | Wong et al. | |
| 2019/0267598 A1* | 8/2019 | Xu ...................... | H01M 50/403 |
| 2020/0203677 A1 | 6/2020 | Lee et al. | |
| 2020/0321661 A1* | 10/2020 | Umesato .............. | H01M 50/70 |

FOREIGN PATENT DOCUMENTS

| | | | |
|---|---|---|---|
| JP | 2006-073541 A | 3/2006 | |
| JP | 2019-216059 A | 12/2019 | |
| JP | 2021197340 A | 12/2021 | |

OTHER PUBLICATIONS

Jinchao Huang, et al., "A calcium hydroxide interlayer as a selective separator for rechargeable alkaline Zn/MnO2 batteries", Electrochem. Commun., 2017, 81, 136 (Jun. 29, 2017).

* cited by examiner

ZINC SECONDARY BATTERY

FIELD

The present disclosure relates to a zinc secondary battery.

BACKGROUND

PTL 1 discloses an alkaline zinc storage battery comprising a separator which has at least a first film facing a positive electrode and a second film facing a negative electrode, wherein the first film is an alkali-resistant porous film, the second film is a polyvinyl alcohol film, and the first film has a metal optionally selected from among nickel, iron, cobalt, platinum, palladium, indium, chromium, manganese and titanium, and alloys composed mainly of these elements.

CITATION LIST

Patent Literature

[PTL 1] Japanese Unexamined Patent Publication No. 2006-73541

SUMMARY

Technical Problem

There is a need to improve the cycle characteristics of zinc secondary batteries, and specifically to inhibit the reduction in charge-discharge capacity that occurs when a zinc secondary battery is repeatedly subjected to charge-discharge.

The object of the disclosure is to provide a zinc secondary battery with an improved cycle characteristic.

Solution to Problem

The present inventors have found that the aforementioned object can be achieved by the following means:

<Aspect 1>

A zinc secondary battery having a positive electrode layer, a covering film-attached porous film layer and a negative electrode layer in that order, with an electrolyte solution impregnating the positive electrode layer, the covering film-attached porous film layer and the negative electrode layer, wherein:

the covering film-attached porous film layer has a porous film layer and a porous covering film formed on the porous film layer, the covering film-attached porous film layer is directly adjacent to the negative electrode layer, and the porous covering film comprises at least one compound selected from the group consisting of $Mg(OH)_2$, $Mg_2P_2O_7$, $MgTiO_3$, $MgCO_3$, $Ca(OH)_2$, $CaSO_4$, $Ca_2P_2O_7$, $SrTiO_3$, $SrF_2$, $TiO_2$, $SnO_2$, $Zr(OH)_4$ and $ZrO_2$.

<Aspect 2>

The zinc secondary battery according to aspect 1, which further has a nonwoven fabric layer further toward the positive electrode layer side than the covering film-attached porous film layer.

<Aspect 3>

The zinc secondary battery according to aspect 2, which further has a porous film layer further toward the positive electrode layer side than the nonwoven fabric layer.

<Aspect 4>

The zinc secondary battery according to any one of aspects 1 to 3, wherein the porous film layer is a porous resin film layer.

<Aspect 5>

The zinc secondary battery according to aspect 4, wherein the porous resin film layer is a polyolefin-based porous layer, a polyamide-based porous layer or a nylon-based porous layer.

<Aspect 6>

The zinc secondary battery according to any one of aspects 1 to 5, wherein the electrolyte solution is an alkali electrolyte solution.

<Aspect 7>

The zinc secondary battery according to any one of aspects 1 to 6, wherein the electrolyte solution comprises $Zn(OH)_4^{2-}$.

Advantageous Effects of Invention

According to the disclosure it is possible to provide a zinc secondary battery with an improved cycle characteristic.

BRIEF DESCRIPTION OF DRAWINGS

FIG. 3 is a schematic diagram showing a zinc secondary battery 102 according to a third embodiment of the disclosure.

FIG. 4 is a schematic diagram showing a zinc secondary battery 103 according to a fourth embodiment of the disclosure.

DESCRIPTION OF EMBODIMENTS

Figure 1:
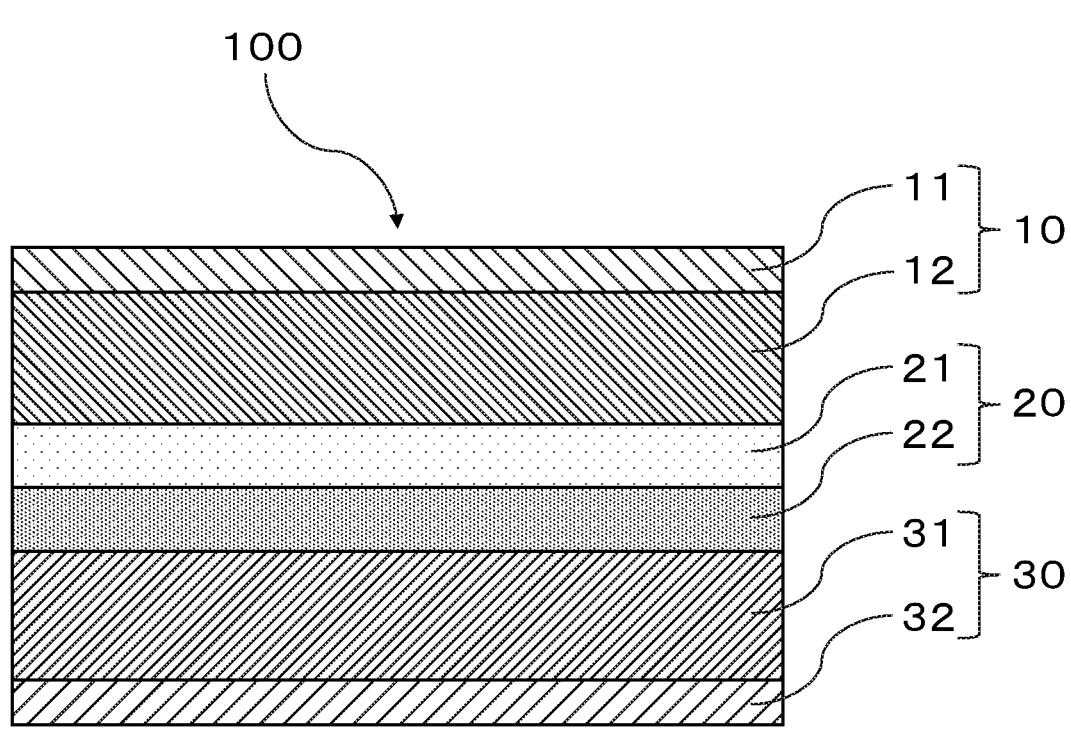
FIG. 1 is a schematic diagram showing a zinc secondary battery 100 according to a first embodiment of the disclosure.

Embodiments of the disclosure will now be described in detail. The disclosure is not limited to the embodiments described below, however, and various modifications may be implemented which do not depart from the gist thereof.

The zinc secondary battery of the disclosure has a positive electrode layer, a covering film-attached porous film layer and a negative electrode layer in that order, with an electrolyte solution impregnating the positive electrode layer, the covering film-attached porous film layer and the negative electrode layer, wherein the covering film-attached porous film layer has a porous film layer and a porous covering film formed on the porous film layer, the covering film-attached porous film layer is directly adjacent to the negative electrode layer, and the porous covering film comprises at least one compound selected from the group consisting of $Mg(OH)_2$, $Mg_2P_2O_7$, $MgTiO_3$, $MgCO_3$, $Ca(OH)_2$, $CaSO_4$, $Ca_2P_2O_7$, $SrTiO_3$, $SrF_2$, $TiO_2$, $SnO_2$, $Zr(OH)_4$ and $ZrO_2$.

The zinc secondary battery of the disclosure may be a nickel-zinc secondary battery, silver oxide-zinc secondary battery manganese oxide-zinc secondary battery or zinc-air secondary battery, or another type of alkali zinc secondary battery. In such a zinc secondary battery, discharge reaction takes place according to reaction formula (1) below at the negative electrode, and often the resulting zincate anion ($Zn(OH)_4^{2-}$) migrates into the electrolyte solution and precipitates as zinc oxide (ZnO) at undesired locations, according to reaction formula (2) below.

Discharge reaction: $Zn+4OH^- \rightarrow Zn(OH)_4^{2-}+2e^-$:

Reaction formula (1)

Precipitation reaction: $Zn(OH)_4^{2-} \rightarrow ZnO+H_2O+2OH^-$:

Reaction formula (2)

A zinc secondary battery may therefore exhibit lower charge-discharge capacity after repeated charge-discharge. One reason for lower charge-discharge capacity is segregation of zinc oxide (ZnO) at the negative electrode. Inhibiting such segregation may therefore inhibit lowering of the charge-discharge capacity of a zinc secondary battery.

One cause of segregation of zinc oxide in the negative electrode layer is thought to be uneven concentration of $Zn(OH)_4^{2-}$ in the electrolyte solution due to repeated charge-discharge.

In the zinc secondary battery of the disclosure, a covering film-attached porous film layer having a porous covering film comprising a specific type of metal compound, i.e. at least one compound selected from the group consisting of $Mg(OH)_2$, $Mg_2P_2O_7$, $MgTiO_3$, $MgCO_3$, $Ca(OH)_2$, $CaSO_4$, $Ca_2P_2O_7$, $SrTiO_3$, $SrF_2$, $TiO_2$, $SnO_2$, $Zr(OH)_4$ and $ZrO_2$, is directly adjacent to the negative electrode layer.

If the porous covering film comprising the metal compound is disposed near the negative electrode layer, then diffusion of $Zn(OH)_4^{2-}$ in the electrolyte solution, and especially diffusion from the region near the negative electrode layer to the positive electrode layer side, will be inhibited. The $Zn(OH)_4^{2-}$ also preferably remains near the negative electrode layer.

In the zinc secondary battery of the disclosure, therefore, segregation of zinc oxide in the negative electrode layer is inhibited, thereby inhibiting reduction in charge-discharge capacity when the zinc secondary battery has undergone repeated charge-discharge. In other words, the cycle characteristic of the zinc secondary battery of the disclosure is improved.

In a zinc secondary battery employing an electrolyte solution, a nonwoven fabric layer is sometimes disposed between the negative electrode layer and positive electrode layer from the viewpoint of retaining the electrolyte solution. It was considered that the porous covering film could also be directly formed on the nonwoven fabric layer, but such a construction was shown to not improve the cycle characteristic of the zinc secondary battery.

FIG. 1 is a schematic diagram showing a zinc secondary battery 100 according to the first embodiment of the disclosure.

As shown in FIG. 1, the zinc secondary battery 100 according to the first embodiment of the disclosure has a positive electrode layer 10, a covering film-attached porous film layer 20 and a negative electrode layer 30 in that order, with an electrolyte solution impregnating the positive electrode layer 10, covering film-attached porous film layer 20 and negative electrode layer 30. The positive electrode layer 10 has a structure in which a positive electrode collector layer 11 and positive electrode active material layer 12 are mutually laminated. Similarly, the negative electrode layer 30 has a structure in which a negative electrode collector layer 32 and negative electrode active material layer 31 are mutually laminated.

In the zinc secondary battery 100 of the disclosure, the covering film-attached porous film layer 20 has a porous film layer 21 and a porous covering film 22 formed on the porous film layer 21. The covering film-attached porous film layer 20 is directly adjacent to the negative electrode layer 30. Notably, in FIG. 1, the porous covering film 22 is directly adjacent to the negative electrode layer 30.

The porous covering film 22 comprises at least one compound selected from the group consisting of $Mg(OH)_2$, $Mg_2P_2O_7$, $MgTiO_3$, $MgCO_3$, $Ca(OH)_2$, $CaSO_4$, $Ca_2P_2O_7$, $SrTiO_3$, $SrF_2$, $TiO_2$, $SnO_2$, $Zr(OH)_4$ and $ZrO_2$.

The zinc secondary battery 100 according to the first embodiment of the disclosure has the porous covering film 22 comprising the metal compound disposed near the negative electrode layer 30, and particularly near the negative electrode active material layer 31, thereby inhibiting diffusion of the electrolyte solution-dissolved $Zn(OH)_4^{2-}$ throughout the electrolyte solution, and especially inhibiting diffusion across the porous covering film 22 to the positive electrode layer 10 side. Preferably, the $Zn(OH)_4^{2-}$ remains near the negative electrode layer 30, and particularly near the negative electrode active material layer 31. This will inhibit segregation of zinc oxide in the negative electrode layer 30 and specifically the negative electrode active material layer 31, resulting in an improved cycle characteristic of the zinc secondary battery 100.

Figure 2:
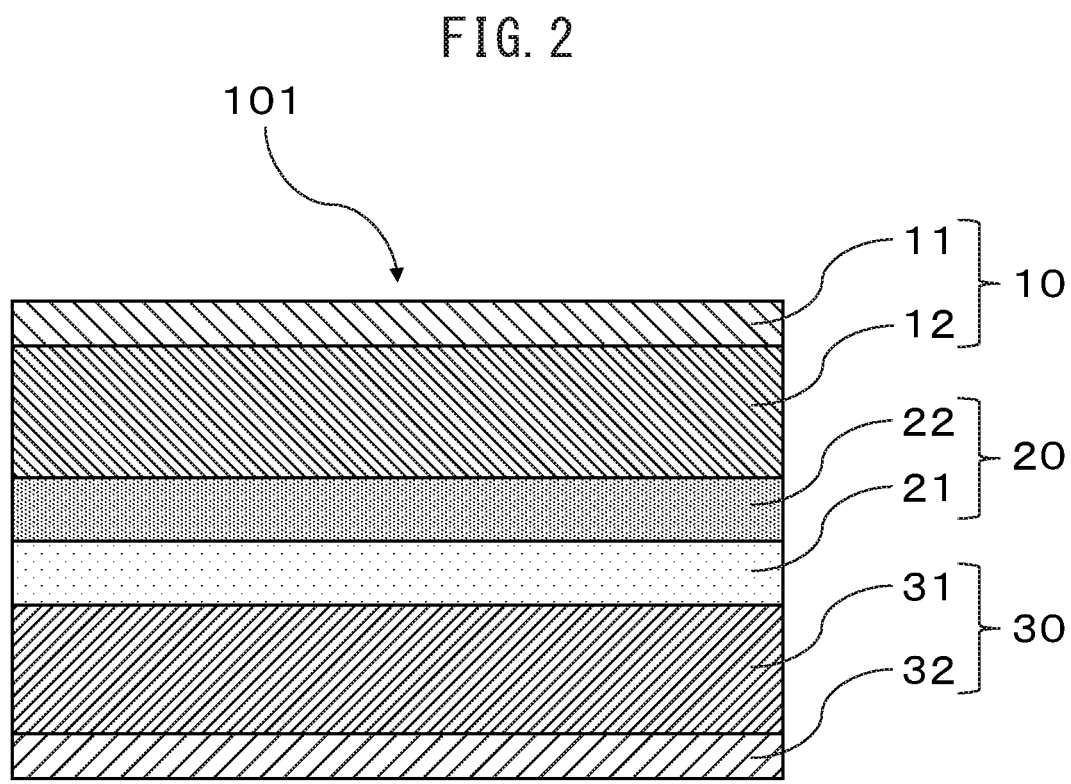
FIG. 2 is a schematic diagram showing a zinc secondary battery 101 according to a second embodiment of the disclosure.

FIG. 2 is a schematic diagram showing a zinc secondary battery 101 according to the second embodiment of the disclosure.

In the zinc secondary battery 101 according to the second embodiment of the disclosure as shown in FIG. 2, the order of lamination of the porous film layer 21 and porous covering film 22 in the covering film-attached porous film layer 20 is different from the construction shown in FIG. 1. Specifically, in the zinc secondary battery 101 shown in FIG. 2, the porous covering film 22 is still adjacent to the negative electrode layer 30, and specifically the negative electrode active material layer 31, but across the porous film layer 21. Although the construction shown in FIG. 2 has the porous covering film 22 separated from the negative electrode layer 30 as compared to the construction shown in FIG. 1, the distance between the porous covering film 22 and negative electrode layer 30 is sufficiently small so that diffusion of $Zn(OH)_4^{2-}$ throughout the electrolyte solution is inhibited, resulting in an improved cycle characteristic of the zinc secondary battery 101.

Figure 3:
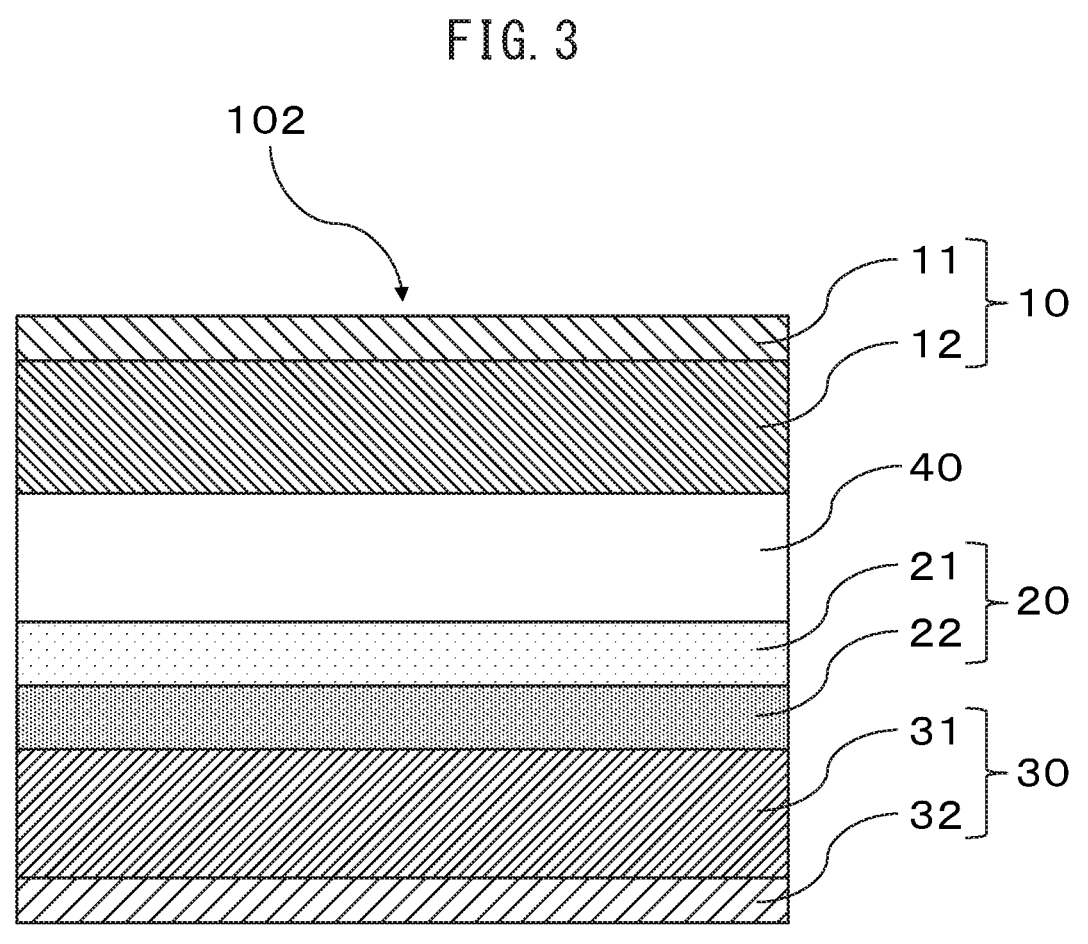

FIG. 3 is a schematic diagram showing a zinc secondary battery 102 according to the third embodiment of the disclosure.

In the zinc secondary battery 102 according to the third embodiment of the disclosure as shown in FIG. 3, a nonwoven fabric layer 40 is disposed between the covering film-attached porous film layer 20 and the positive electrode layer 10, in addition to the construction shown in FIG. 1. This type of construction can also improve the cycle characteristic of the zinc secondary battery 102, for the same reason as the construction of FIG. 1.

Figure 4:
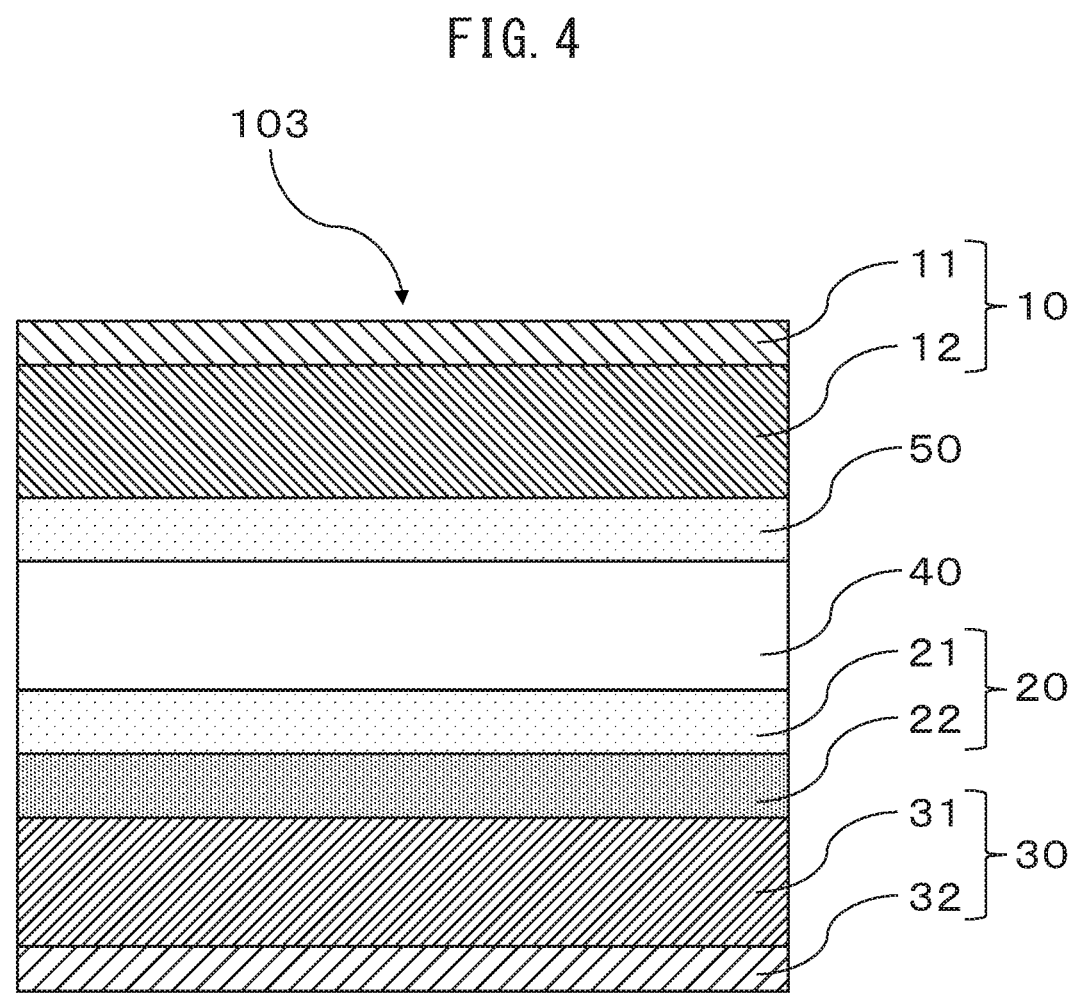

FIG. 4 is a schematic diagram showing a zinc secondary battery 103 according to the fourth embodiment of the disclosure.

In the zinc secondary battery 103 according to the fourth embodiment of the disclosure as shown in FIG. 4, a porous film layer 50 is further provided between the nonwoven fabric layer 40 and the positive electrode layer 10, in addition to the construction shown in FIG. 3. This type of construction can also improve the cycle characteristic of the zinc secondary battery 102, for the same reason as the construction of FIG. 1.

FIGS. 1 to 4 are not intended to limit the scope of the separator for a zinc secondary battery of the disclosure.

Figure 5:
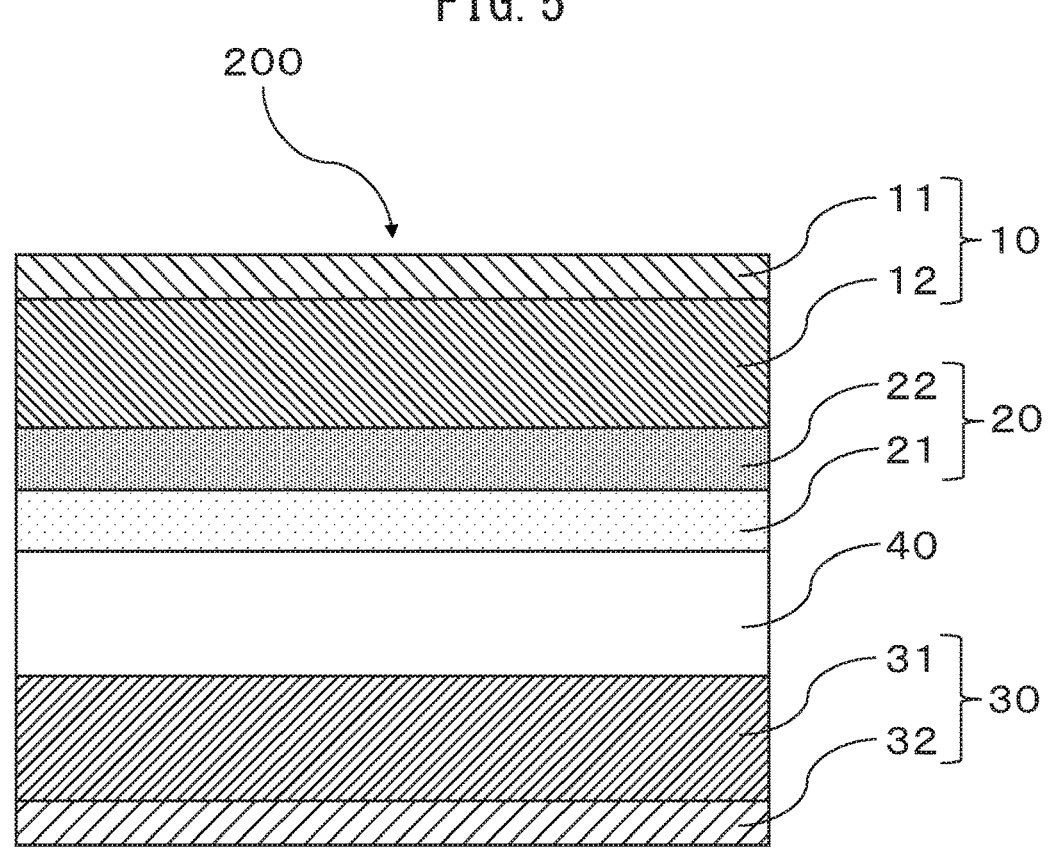
FIG. 5 is a schematic diagram showing a zinc secondary battery 200 that is different from the embodiments of the disclosure.
Figure 6:
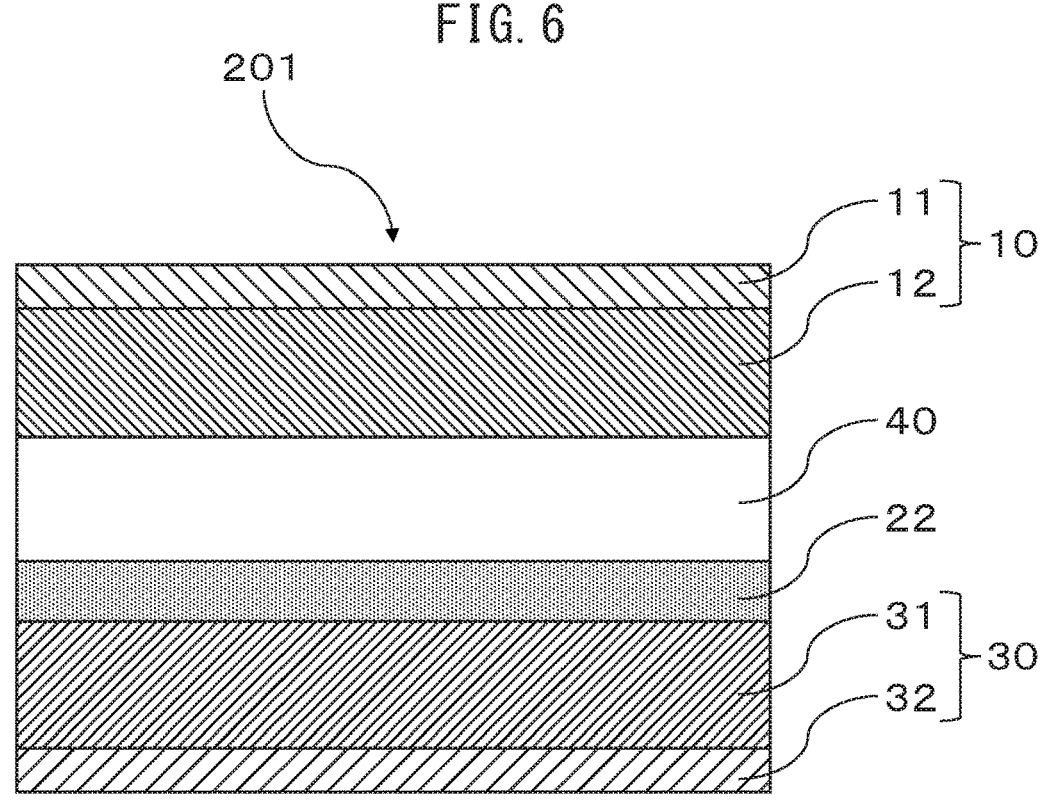
FIG. 6 is a schematic diagram showing yet another zinc secondary battery 201 that is different from the embodiments of the disclosure.

An improved zinc secondary battery cycle characteristic is not obtained with the zinc secondary batteries 200 and 201 shown in FIGS. 5 and 6, for example, which are different from the zinc secondary battery of the disclosure and different from the embodiments of the disclosure.

FIG. 5 is a schematic diagram showing a zinc secondary battery 200 that is different from the embodiments of the disclosure.

In the zinc secondary battery 200 different from the embodiments of the disclosure as shown in FIG. 5, a nonwoven fabric layer 40 is disposed between a covering film-attached porous film layer 20 and a negative electrode layer 30, in contrast to the construction shown in FIG. 1. In this type of construction, where the nonwoven fabric layer 40 is disposed between the porous covering film 22 and negative electrode layer 30, the porous covering film 22 is more greatly separated from the negative electrode layer 30. Diffusion of the electrolyte solution-dissolved $Zn(OH)_4^{2-}$ throughout the electrolyte solution, and especially diffusion from the region near the negative electrode layer to the positive electrode layer side, is therefore not inhibited. As a result, no improvement is obtained in the cycle characteristic of the zinc secondary battery.

FIG. 6 is a schematic diagram showing yet another zinc secondary battery 201 that is different from the embodiments of the disclosure.

In the zinc secondary battery 201 shown in FIG. 6 that is different from the embodiments of the disclosure, the covering film-attached porous film layer 20 itself is directly adjacent to the negative electrode layer, similar to the construction shown in FIG. 1. In the construction of FIG. 6, however, the porous covering film 22 is formed directly on the nonwoven fabric layer 40 instead of the covering film-attached porous film layer 20. Since the porous covering film cannot be formed with sufficient bonded density in this type of construction, it is impossible to adequately inhibit diffusion of the electrolyte solution-dissolved $Zn(OH)_4^{2-}$ throughout the electrolyte solution, and especially diffusion from the region near the negative electrode layer to the positive electrode layer side, such that improvement in the cycle characteristic of the zinc secondary battery cannot be obtained.

<Positive Electrode Layer>

The positive electrode layer may have a construction in which the positive electrode active material layer is layered on the positive electrode collector, and for example, it may have the surface of the positive electrode collector covered by a positive electrode active material layer.

(Positive Electrode Collector)

The positive electrode collector may be a conductive material, or in other words a metal such as stainless steel, nickel or titanium, or carbon, with no limitation to these. The material of the positive electrode collector may be nickel.

The form of the current collector layer is not particularly restricted and may be, for example, rod-shaped, foil-shaped, plate-shaped, mesh-like or porous. The collector may be metal Celmet.

(Positive Electrode Active Material Layer)

The positive electrode active material layer comprises a positive electrode active material, and optionally a binder and other additives. The positive electrode active material may be appropriately selected depending on the type of zinc secondary battery. The positive electrode active material may also comprise at least one compound selected from the group consisting of nickel hydroxide, nickel oxyhydroxide, manganese hydroxide, manganese oxyhydroxide, manganese dioxide, silver, silver oxide, and oxygen gas.

An example of a binder is styrene-butadiene-rubber (SBR), without being limitative.

<Separator Layer>

The zinc secondary battery of the disclosure has a separator layer between the positive electrode layer and the negative electrode layer. The covering film-attached porous film layer of the zinc secondary battery of the disclosure constitutes all or part of the separator layer.

The separator layer may also have multiple layers, such as a porous film layer separate from the nonwoven fabric layer and the porous film layer forming the covering film-attached porous film layer, in addition to the covering film-attached porous film layer.

When the separator layer has other layers in addition to the covering film-attached porous film layer, such layers are disposed between the covering film-attached porous film layer and the positive electrode layer.

<Covering Film-Attached Porous Film Layer>

The covering film-attached porous film layer has a porous film layer and a porous covering film formed on the porous film layer.

The covering film-attached porous film layer is directly adjacent to the negative electrode layer. The covering film-attached porous film layer is disposed in such a manner that either the porous film layer or the porous covering film is facing the negative electrode layer. From the viewpoint of further inhibiting diffusion of $Zn(OH)_4^{2-}$ throughout the electrolyte solution, the covering film-attached porous film layer is most preferably disposed with the porous covering film facing the negative electrode layer. The term "directly adjacent" means adjacent without any other layer being present between them.

(Porous Film Layer)

The porous film layer is a porous layer having an insulating property and having through-holes running through both sides of the film. The porous film layer may be hydrophobic or hydrophilic.

The porosity rate and pore size of the porous film layer may be a porosity and pore size generally desired for a separator for a zinc secondary battery.

The thickness of the porous film layer may be 10 μm to 1000 μm, for example. The thickness of the conductive porous film layer may be 10 μm or greater, 50 μm or greater or 100 μm or greater, and 1000 μm or smaller, 500 μm or smaller or 200 μm or smaller.

The porous film layer used may be a resin porous film layer, and more specifically a polyolefin-based porous layer, polyamide-based porous layer or nylon-based porous layer, with no limitation to these.

The porous film layer may be hydrophilicized by adding a hydrophilic functional group, for example.

The "porous" modifier of the phrase "porous film layer" means that it has numerous through-holes running from the front to the back of the layer. The porous film layer may therefore also be a sponge layer, for example.

(Porous Covering Film)

The porous covering film comprises at least one compound selected from the group consisting of $Mg(OH)_2$, $Mg_2P_2O_7$, $MgTiO_3$, $MgCO_3$, $Ca(OH)_2$, $CaSO_4$, $Ca_2P_2O_7$, $SrTiO_3$, $SrF_2$, $TiO_2$, $SnO_2$, $Zr(OH)_4$ and $ZrO_2$.

The porous covering film can be formed, for example, by dispersing the metal compound and a binder in a dispersing medium to prepare an ink, and coating and drying it onto the porous film layer.

<Nonwoven Fabric Layer>

The zinc secondary battery of the disclosure may further have a nonwoven fabric layer further toward the positive electrode layer side than the covering film-attached porous film layer. In other words, the separator layer in the zinc secondary battery of the disclosure may have a construction in which the covering film-attached porous film layer and nonwoven fabric layer are layered in that order from the negative electrode layer side.

The nonwoven fabric layer may be a cellulosic nonwoven fabric, for example.

<Porous Film Layer>

The zinc secondary battery of the disclosure may further have a porous film layer further toward the positive electrode layer side than the covering film-attached porous film layer. In other words, the separator layer in the zinc secondary battery of the disclosure may have a construction in which the covering film-attached porous film layer, nonwoven fabric layer and porous film layer are layered in that order from the negative electrode layer side, for example.

<Negative Electrode Layer>

The negative electrode layer may have a construction in which the negative electrode active material layer is layered on the negative electrode collector, and for example, it may have the surface of the negative electrode collector covered by a negative electrode active material layer.

(Negative Electrode Collector)

The negative electrode collector may be a conductive material, for example, a metal such as stainless steel, aluminum, copper, nickel, iron, tin or titanium, or carbon, with no limitation to these. The material of the negative electrode collector may be tin, for example.

The form of the current collector layer is not particularly restricted and may be, for example, rod-shaped, foil-shaped, plate-shaped, mesh-like or porous. The collector may be metal Celmet.

(Negative Electrode Active Material Layer)

The negative electrode active material layer comprises zinc and zinc oxide, and an optional binder and other additives. The zinc-based negative electrode active material layer may further comprise a zinc compound such as calcium zincate, for example.

Examples of binders include, but are not limited to, styrene-butadiene-rubber (SBR) and polytetrafluoroethylene (PTFE).

<Electrolyte Solution>

The zinc secondary battery of the disclosure has an electrolyte solution impregnating the positive electrode layer, the covering film-attached porous film layer and the negative electrode layer.

The electrolyte solution may be an aqueous solution, and more specifically an alkali electrolyte solution. The alkali electrolyte solution may be an electrolyte solution comprising an alkali metal hydroxide, and more specifically potassium hydroxide, sodium hydroxide, lithium hydroxide or ammonium hydroxide. The electrolyte solution is preferably potassium hydroxide. Other inorganic or organic additives may also be present in the electrolyte solution.

Zinc oxide may also be dissolved in the electrolyte solution. The zinc oxide may be dissolved in the electrolyte solution in a state of saturation at ordinary temperature. In other words, the electrolyte solution may comprise $Zn(OH)_4^{2-}$.

EXAMPLES

Examples 1 to 13 and Comparative Examples 1 and 2

A zinc secondary battery was produced for Example 1 in the following manner.

<Preparation of Electrolyte Solution>

A 6 mol/L potassium hydroxide aqueous solution was prepared using 4 mol/L and 8 mol/L of aqueous potassium hydroxide. ZnO was added to the 6 mol/L of aqueous potassium hydroxide until a precipitate formed, and the temperature was controlled with a thermostatic bath at 25° C. for 3 hours or longer to obtain an electrolyte solution.

<Production of Separator Layer>

A nonwoven fabric separator was sandwiched between hydrophilicized polypropylene separators to produce a separator. The polypropylene separator had a thickness of 20 μm.

A porous covering film was then formed on the polypropylene separator.

Specifically, the metal compound powder used in each Example listed in Table 1 below, with styrene-butadiene rubber (SBR) and carboxymethyl cellulose (CMC), were weighed out to a mass ratio of 97.0:2.5:0.5 and the mixture was kneaded with a mortar, after which the hardness was adjusted with water and the components were mixed for 1 minute at 2000 rpm using an Awatori Rentaro, to prepare an ink for formation of a porous covering film. The porous covering film-forming ink was coated onto the surface of the polypropylene separator using a doctor blade and allowed to naturally dry, after which it was dried overnight in a reduced pressure environment at 80° C. to form a porous covering film. No porous covering film was formed on the polypropylene separator in Comparative Example 1.

TABLE 1

| Example | Metal compound |
|---|---|
| Example 1 | $Mg(OH)_2$ |
| Example 2 | $Mg_2P_2O_7$ |
| Example 3 | $MgTiO_3$ |
| Example 4 | $MgCO_3$ |
| Example 5 | $Ca(OH)_2$ |
| Example 6 | $CaSO_4 \cdot 2H_2O$ |
| Example 7 | $Ca_2P_2O_7$ |
| Example 8 | $SrTiO_3$ |
| Example 9 | $SrF_2$ |
| Example 10 | $TiO_2$ |
| Example 11 | $SnO_2$ |
| Example 12 | $Zr(OH)_4$ |
| Example 13 | $ZrO_2$ |
| Comp. Ex. 1 | None |
| Comp. Ex. 2 | $MgF_2$ |

For hydrophilicizing treatment of the polypropylene separator, 1 g of a surfactant was added to a mixed solution containing 50 g of ethanol and 50 g of ultrapure water and the solution was thoroughly dispersed, after which the polypropylene separator was cut to 7 cm and immersed in the solution for 1 minute, and then raised out and allowed to naturally dry and set in a thermostatic bath at 40° C. for 3 hours or longer.

<Production of Positive Electrode Layer>

After weighing out Ni(OH)$_2$ (in an auxiliary agent), SBR and CMC in a mass ratio of 97.0:2.5:0.5, the mixture was kneaded with a mortar, after which the hardness was adjusted with water and mixing was carried out for 1 minute at 2000 rpm using an Awatori Rentaro, to prepare a positive electrode mixture ink. The positive electrode mixture ink was coated onto a Ni foil surface using a doctor blade, and after allowing it to naturally dry, it was dried overnight in a reduced pressure environment at 80° C. to produce a positive electrode layer.

<Production of Negative Electrode Layer>

After weighing out ZnO, Zn, SBR and CMC in a mass ratio of 77.0:20.0:2.5:0.5, the mixture was kneaded with a mortar, after which the hardness was adjusted with water and mixing was carried out for 1 minute at 2000 rpm using an Awatori Rentaro, to prepare a negative electrode mixture ink. The negative electrode mixture ink was coated onto a Sn-plated Cu foil surface using a doctor blade, and after allowing it to naturally dry, it was dried overnight in a reduced pressure environment at 80° C. to produce a negative electrode layer.

<Battery Assembly>

The positive electrode layer, separator layer and negative electrode layer were layered in that order and housed in a battery case. The battery case was then filled with an electrolyte solution to obtain a zinc secondary battery.

The separator layer had the porous covering film, polypropylene separator, nonwoven fabric separator and polypropylene separator disposed in that order from the negative electrode layer side.

<Charge-Discharge Cycling Test>

Each of the zinc secondary batteries of the Examples was subjected to a charge-discharge cycling test, determining the number of cycles until the discharge capacity fell below 70% of the initial value.

The charge-discharge cycling test was carried out with a charge-discharge range of 0% to 50% state of charge (SOC), with the theoretical charge capacity of the positive electrode layer as 100%. The C rate was 3.5 mA/cm$^2$. The cut voltage was 2 V during charge and 1.3 V during discharge. The cycle test was carried out with an interval of 5 minutes between each cycle.

The number of cycles until the discharge capacity fell below 70% of the initial value was recorded as the cycle life for each of the zinc secondary batteries of the Examples, and this value was divided by the negative electrode/positive electrode capacity ratio (cycle life/capacity ratio).

<Results>

Figure 7:
FIG. 7 is a graph comparing the cycle life/capacity ratio for each of the zinc secondary batteries of Examples 1 to 13 and Comparative Examples 1 and 2.

The results are shown in FIG. 7.

As shown in FIG. 7, with the zinc secondary batteries of Examples 1 to 13 which used Mg(OH)$_2$, Mg$_2$P$_2$O$_7$, MgTiO$_3$, MgCO$_3$, Ca(OH)$_2$, CaSO$_4$·2H$_2$O, Ca$_2$P$_2$O$_7$, SrTiO$_3$, SrF$_2$, TiO$_2$, SnO$_2$, Zr(OH)$_4$ and ZrO$_2$ in that order as materials for the porous covering film, an increased cycle life/capacity ratio and improved cycle characteristics were exhibited compared to Comparative Example 1 which did not have a porous covering film formed.

On the other hand, Comparative Example 2 which used MgF$_2$ as the material for the porous covering film had an even lower cycle life/capacity ratio than Comparative Example 1 which had no porous covering film formed, and its cycle characteristic was instead poorer.

Example 1 and Comparative Examples 1, 3 and 4

<Fabrication of Zinc Secondary Batteries>

Example 1 and Comparative Example 1 were the same as <Examples 1 to 13 and Comparative Examples 1 and 2> described above.

The zinc secondary battery of Comparative Example 3 was fabricated in the same manner as Example 1, except that the separator layer had the polypropylene separator, nonwoven fabric separator, polypropylene separator and porous covering film disposed in that order from the negative electrode layer side.

The zinc secondary battery of Comparative Example 4 was fabricated in the same manner as Example 1, except that the separator layer used was one having the porous covering film formed by coating a porous covering film-forming ink directly on a nonwoven fabric separator. The separator layer of the zinc secondary battery of Comparative Example 4 had a porous covering film and nonwoven fabric separator disposed in that order from the negative electrode layer side.

Specifically, the construction of the separator layers in the zinc secondary batteries of each of the Examples were as follows.

Example 1: (negative electrode side) porous covering film/polypropylene separator/nonwoven fabric separator/polypropylene separator (positive electrode side)

Comparative Example 1: (negative electrode side) polypropylene separator/nonwoven fabric separator/polypropylene separator (positive electrode side)

Comparative Example 3: (negative electrode side) polypropylene separator/nonwoven fabric separator/polypropylene separator/porous covering film (positive electrode side)

Comparative Example 4: (negative electrode side) porous covering film/nonwoven fabric separator (positive electrode side)

<Test>

Each of the zinc secondary batteries of the Examples was subjected to a charge-discharge cycling test, by the method described under <Charge-discharge cycling test> for <Examples 1 to 13 and Comparative Examples 1 and 2>.

<Results>

Figure 8:
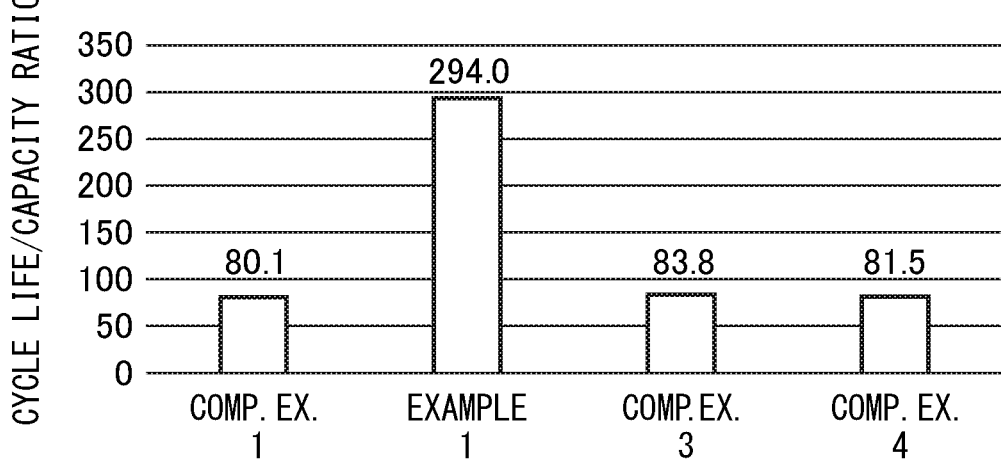
FIG. 8 is a graph comparing the cycle life/capacity ratio for each of the zinc secondary batteries of Example 1 and Comparative Examples 1, 3 and 4.

The results are shown in FIG. 8.

As shown in FIG. 8, Comparative Example 1 wherein the construction of the separator layer of the zinc secondary battery was (negative electrode side) polypropylene separator/nonwoven fabric separator/polypropylene separator (positive electrode side), Comparative Example 3 wherein it was (negative electrode side) polypropylene separator/nonwoven fabric separator/polypropylene separator/porous covering film (positive electrode side), and Comparative Example 4 wherein it was (negative electrode side) porous covering film/nonwoven fabric separator (positive electrode side), all had low cycle life/capacity ratios compared to the zinc secondary battery of Example 1 wherein the construction of the separator layer of the zinc secondary battery was: (negative electrode side) polypropylene separator/nonwoven fabric separator/polypropylene separator (positive electrode side).

REFERENCE SIGNS LIST

100 to 103, 200, 201 Zinc secondary battery
10 Positive electrode layer
11 Positive electrode collector layer
12 Positive electrode active material layer
20 Covering film-attached porous film layer 21 Porous film layers
22 Porous covering film
30 Negative electrode layer
31 Negative electrode active material layer
32 Negative electrode collector layer
40 Nonwoven fabric layer
50 Porous film layer

The invention claimed is:

1. A zinc secondary battery having a positive electrode layer, a covering film-attached porous film layer and a negative electrode layer in that order, with an electrolyte solution impregnating the positive electrode layer, the covering film-attached porous film layer and the negative electrode layer:

wherein the covering film-attached porous film layer has a first porous film layer and a porous covering film formed on the first porous film layer, wherein the porous covering film is directly adjacent to the negative electrode layer, wherein the porous covering film comprises at least one compound selected from the group consisting of $Mg(OH)_2$, $Mg_2P_2O_7$, $MgTiO_3$, $MgCO_3$, $Ca(OH)_2$, $CaSO_4$, $Ca_2P_2O_7$, $SrTiO_3$, $SrF_2$, $TiO_2$, $SnO_2$, $Zr(OH)_4$ and $ZrO_2$ wherein the zinc secondary battery further has a nonwoven fabric layer further toward the positive electrode layer side than the covering film-attached porous film layer, wherein the zinc secondary battery further has a second porous film layer further toward the positive electrode layer side than the nonwoven fabric layer, and wherein the first and second porous film layers are sponge-like resin film layers.

2. The zinc secondary battery according to claim 1, wherein the porous resin film layer is a polyolefin-based porous layer, a polyamide-based porous layer or a nylon-based porous layer.

3. The zinc secondary battery according to claim 1, wherein the electrolyte solution is an alkali electrolyte solution.

4. The zinc secondary battery according to claim 1, wherein the electrolyte solution comprises $Zn(OH)_4^{2-}$.

5. The zinc secondary battery according to claim 1, wherein the porous covering film comprises at least one compound selected from the group consisting of $Mg(OH)_2$, $Mg_2P_2O_7$, $MgTiO_3$, $MgCO_3$, $Ca(OH)_2$, $CaSO_4$, $Ca_2P_2O_7$, $SrTiO_3$, $SrF_2$, $SnO_2$ and $Zr(OH)_4$.

* * * * *